United States Patent
Keeni

(10) Patent No.: US 10,979,323 B2
(45) Date of Patent: Apr. 13, 2021

(54) NETWORK MAP DISPLAY METHOD AND NETWORK MAP DISPLAY PROGRAM

(71) Applicant: CYBER SOLUTIONS INC., Miyagi (JP)

(72) Inventor: Glenn Mansfield Keeni, Miyagi (JP)

(73) Assignee: CYBER SOLUTIONS INC., Miyagi (JP)

( * ) Notice: Subject to any disclaimer, the term of this patent is extended or adjusted under 35 U.S.C. 154(b) by 0 days.

(21) Appl. No.: 16/617,524

(22) PCT Filed: May 31, 2018

(86) PCT No.: PCT/JP2018/020982
§ 371 (c)(1),
(2) Date: Nov. 27, 2019

(87) PCT Pub. No.: WO2018/221660
PCT Pub. Date: Dec. 6, 2018

(65) Prior Publication Data
US 2020/0186452 A1 Jun. 11, 2020

(30) Foreign Application Priority Data
May 31, 2017 (JP) ............................. JP2017-108736

(51) Int. Cl.
*H04L 12/26* (2006.01)
*H04L 12/44* (2006.01)
(Continued)

(52) U.S. Cl.
CPC ............ *H04L 43/045* (2013.01); *H04L 12/44* (2013.01); *H04L 41/0806* (2013.01);
(Continued)

(58) Field of Classification Search
None
See application file for complete search history.

(56) References Cited

U.S. PATENT DOCUMENTS 8,385,341 B2 * 2/2013 Kern ................... H04L 12/4658
370/390
9,019,973 B1 * 4/2015 Shukla ................... H04L 45/66
370/401
(Continued)

FOREIGN PATENT DOCUMENTS

EP 2600566 A1 6/2013
GB 2372400 A 8/2002
(Continued)

OTHER PUBLICATIONS

ISR; Japan Patent Officel Tokyo, Japan; Aug. 1, 2018.
(Continued)

*Primary Examiner* — Anh Vu H Ly
(74) *Attorney, Agent, or Firm* — Patshegen IP LLC; Moshe Pinchas

(57) ABSTRACT

The present invention is a method for drawing connections for one or more Layer-2 switches as a tree-type network map. The method includes
 a first step of generating a MvP table consisting of a mapping table M1 and a mapping table M2 based on management information collected from the Layer-2 switches by network monitoring manager H;
 a third step of identifying parent-child relationship of Layer-2 switches based on the Connection-information between Layer-2 switches in the second step, and generating a Layered-structure of Layer-2 switches based on the parent-child relationship; and
 a fourth step of drawing connections for Layer-2 switches as a tree-type network map based on the Layered-structure of Layer-2 switches in the third step.

10 Claims, 6 Drawing Sheets

(51) Int. Cl.
*H04L 12/24* (2006.01)
*H04L 12/741* (2013.01)
*H04L 12/947* (2013.01)
*H04L 29/12* (2006.01)
*H04L 29/08* (2006.01)

(52) U.S. Cl.
CPC .......... *H04L 43/0811* (2013.01); *H04L 45/54* (2013.01); *H04L 49/25* (2013.01); *H04L 61/20* (2013.01); *H04L 69/324* (2013.01); *H04L 61/6022* (2013.01)

(56) References Cited

U.S. PATENT DOCUMENTS

| | | | |
|---|---|---|---|
| 9,819,587 B1 * | 11/2017 | Tracy | H04L 45/7453 |
| 9,906,443 B1 * | 2/2018 | Singh | H04L 47/74 |
| 2009/0028067 A1 | 1/2009 | Keeni et al. | |
| 2013/0108263 A1 * | 5/2013 | Srinivas | H04L 12/28 |
| | | | 398/45 |
| 2013/0227338 A1 * | 8/2013 | Lingafelt | H04L 12/4641 |
| | | | 714/4.5 |
| 2016/0269235 A1 * | 9/2016 | Zimmermann | H05K 5/03 |
| 2018/0006884 A1 * | 1/2018 | Zimmermann | H04L 43/04 |

FOREIGN PATENT DOCUMENTS

| | | |
|---|---|---|
| JP | 2001-320393 A | 11/2001 |
| JP | 2012-222580 A | 11/2012 |

OTHER PUBLICATIONS

"Evalution of Automatic Arrangement Algorithm for Network Configuration Information Displaying System"; DICOMO 2007; Kodama, Kiyoyuki et. al.; Jul. 2007.

Supplementary European Search Report; The Hague; dated Jan. 25, 2021.

* cited by examiner

[Figure 1]
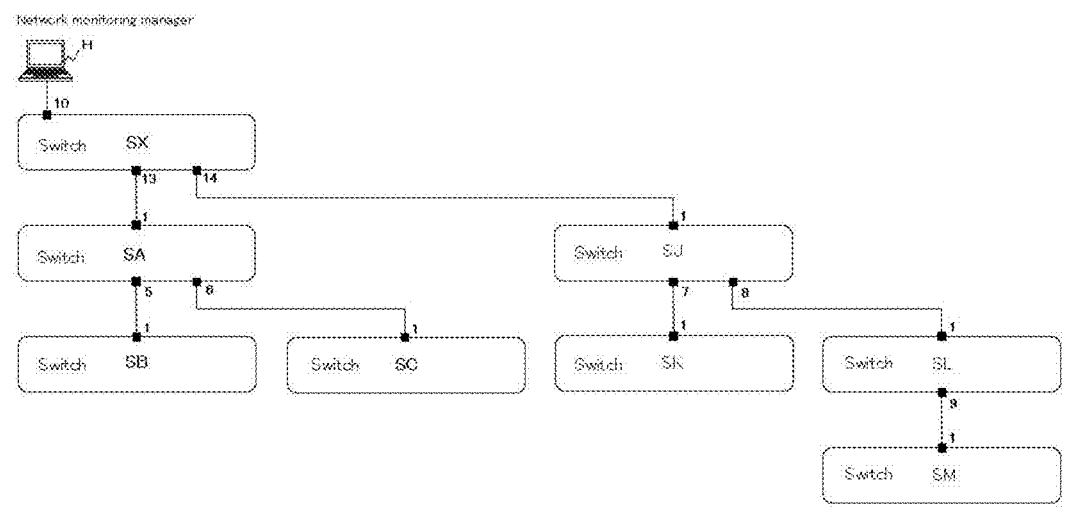

[Figure 2]
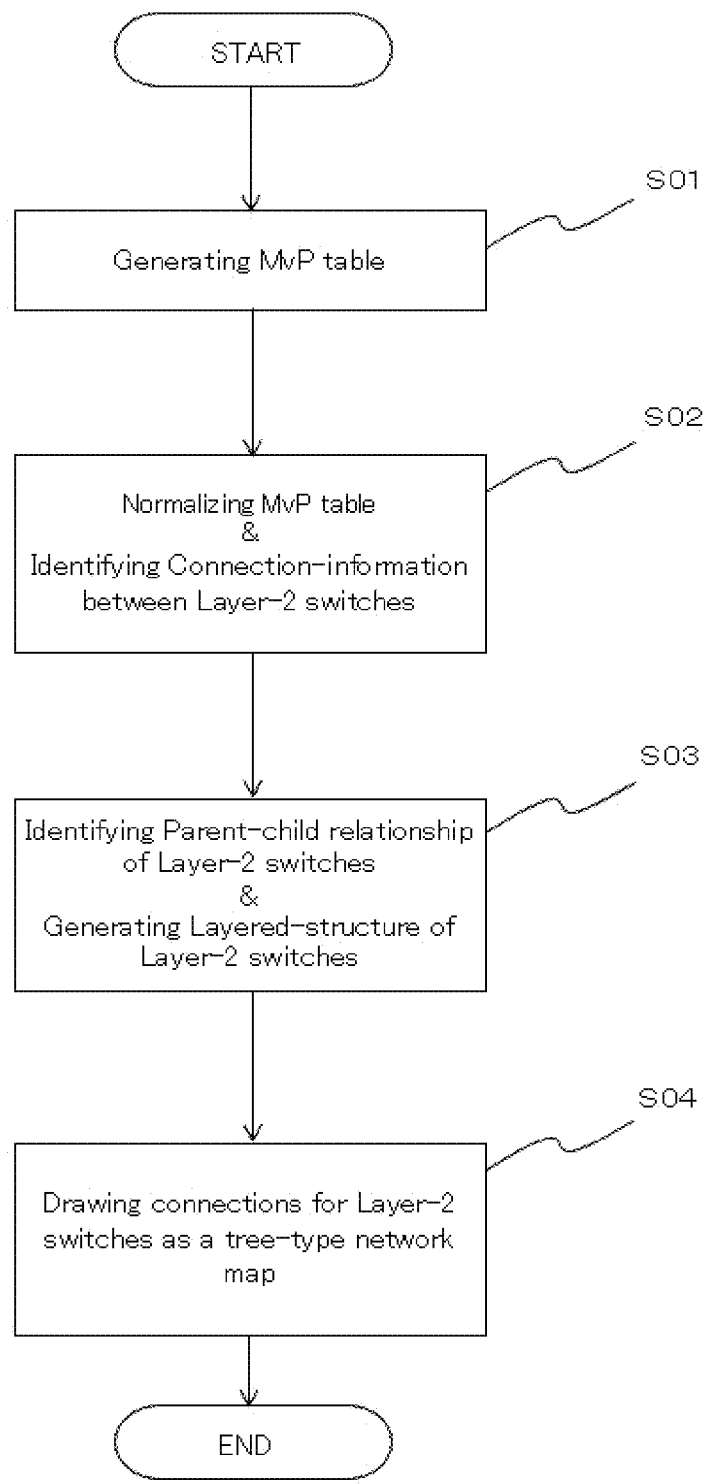

■ Connected-information between Layer-2 switches

| | | |
|---|---|---|
| P[SX, 13] | ⇔ P[SA, 1] | ······① |
| P[SX, 14] | ⇔ P[SJ, 1] | ······② |
| P[SA, 5] | ⇔ P[SB, 1] | ······③ |
| P[SA, 6] | ⇔ P[SC, 1] | ······④ |
| P[SJ, 7] | ⇔ P[SK, 1] | ······⑤ |
| P[SJ, 8] | ⇔ P[SL, 1] | ······⑥ |
| P[SL, 9] | ⇔ P[SM, 1] | ······⑦ |

■ Parent-child relationship of Layer-2 switches

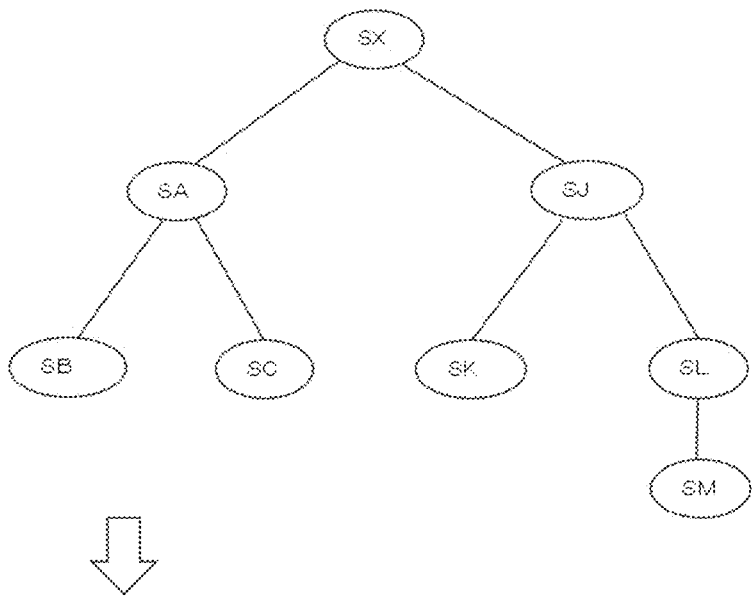

■ Layered-structure of Layer-2 switches

| Layer-2 switch | Layer-2 switches connected directly below the Layer-2 switch | Total number of Layer-2 switches which are placed in lowermost-layer |
|---|---|---|
| SX | SA  SJ | 4 |
| SA | SB  SC | 2 |
| SB | (empty) | 0 |
| SC | (empty) | 0 |
| SJ | SK  SL | 2 |
| SK | (empty) | 0 |
| SL | SM | 1 |
| SM | (empty) | 0 |

[Figure 5]
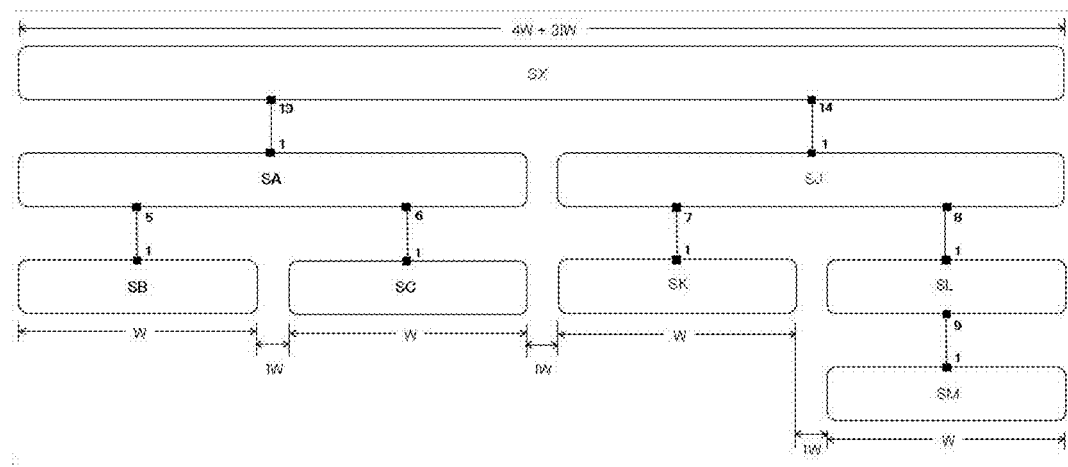

[Figure 6]
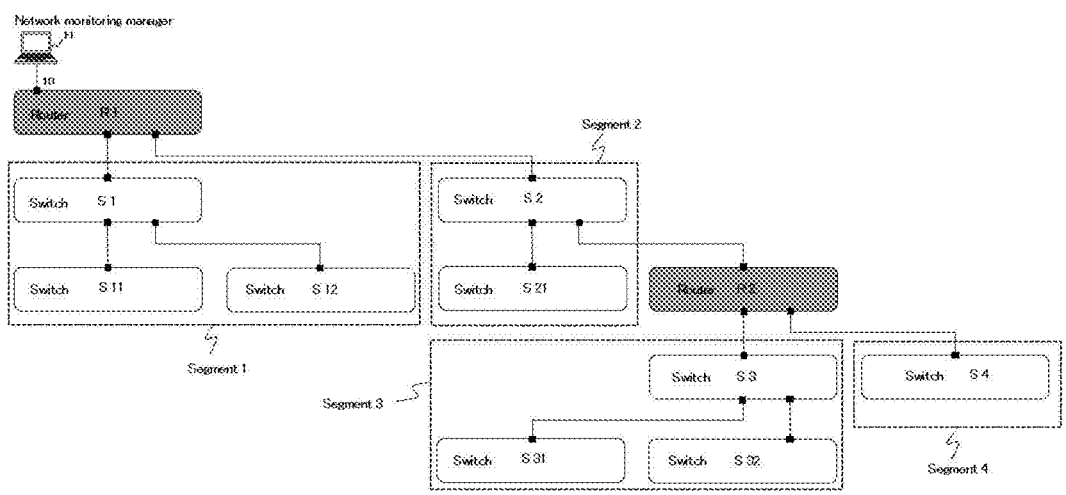

NETWORK MAP DISPLAY METHOD AND NETWORK MAP DISPLAY PROGRAM

TECHNICAL FIELD

The present invention relates to a method and a program for drawing connections for one or more Layer-2 switches as a tree-type network map.

BACKGROUND TECHNOLOGY

With the expanding scale and complexity of networks, network security and management has become a critical issue and it is increasingly important for efficient network management that a network administrator has the latest information of the connections between communication apparatuses in a network.

There is a way to get Connection-information between one or more Layer-2 switches connected to communication apparatuses in network and to draw connections for one or more Layer-2 switches as a tree-type network map based on said Connection-information.

"Patent document 1" discloses a network map creation method, which detects the inter connections of the OSI Reference Model Layer-2 switches and the connections of computers to the OSI Reference Model Layer-2 switches in the network in which there are one or more OSI Reference Model layer-2 switches, by generating a MvP table as mapping table with MAC address and port information of Layer-2 switches based on port information of Layer-2 switches, and identifies connections of Layer-2 switches and connections of computers to the Layer-2 switches in the network. The inventor of this invention is "Keeni, Glenn Mansfield" that is the same as the inventor in the present application. Likewise, the assignee of this invention is "CYBER SOLUTIONS INC." that is the same as the assignee in the present application.

[Patent document 1] Japanese Patent Registration No. 4653164

DISCLOSURE OF THE INVENTION

Problem to be Solved by the Invention

As described above, it is increasingly important for efficient network management that a network administrator has the latest information of the connections between communication apparatuses in a network. For instance, it enables efficient network management by drawing the connections as a tree-type network map based the latest information.

The present invention proposes a method and a program for drawing connections for one or more Layer-2 switches as a tree-type network map, using the method for generating MvP table and identifying connections between Layer-2 switches based on "Patent document 1".

That is, the present invention provides the method and the program for drawing connections for one or more Layer-2 switches as a tree-type network map for a network, in which there are one or more layer-2 switches.

Means to Solve the Problem

The invention described in claim 1 is a method for drawing connections for one or more Layer-2 switches as a tree-type network map, comprising of:

a first step of generating a MvP table consisting of a mapping table M1 and a mapping table M2 based on management information collected from the Layer-2 switches by network monitoring manager H, wherein said mapping table M1 provides a mapping between MAC address M (H) of network monitoring manager H and a Switch-Port set Row{M(H)} of ports of Layer-2 switches Sj ($1 \leq j \leq$ total number of Layer-2 switches) that detected said MAC address M(H), and said mapping table M2 provides a mapping between MAC address M(Sj) of Layer-2 switches Sj and Switch-Port set Row{M(Sj)} of ports of Layer-2 switches Sj that detected said MAC address M(Sj);

a second step of normalizing the MvP table, wherein, if the same Switch-Port element is seen in both the Switch-Port set Row{M(H)} of the mapping table M1 and the Switch-Port set Row{M (Sj)} of the mapping table M2, the MvP table is normalized by deleting Switch-Port elements P(Sj,n) ($1 \leq n \leq$ total number of ports of Layer-2 switches Sj) corresponding to the same Switch-Port from the Switch-Port set Row{M(Sj)} of the mapping table M2, and Connection-information between Layer-2 switches is identified based on normalized MvP table;

a third step of identifying parent-child relationship of Layer-2 switches based on said Connection-information between Layer-2 switches in the second step, and generating a Layered-structure of Layer-2 switches based on said parent-child relationship;

a fourth step of drawing connections for Layer-2 switches as a tree-type network map based on said Layered-structure of Layer-2 switches in the third step.

The invention described in claim 2 is the method according to claim 1, wherein the second step comprises of:

(1) Deleting Switch-Port elements P (Sj, n) ($1 \leq n \leq$ total number of ports of Layer-2 switches Sj) corresponding to the same Switch-Port from Switch-Port set Row{M(Sj)} of the mapping table M2, if the same Switch-Port is seen in both the Switch-Port set Row{M(H)} of the mapping table M1 and the Switch-Port set Row{M(Sj)} of the mapping table M2; and (2) From the Switch-Port set Row{M(Sj)} which has a singleton element, selecting the Switch-Port element P[Sk, x] ($1 \leq k \leq$ number of layer-2 switches, x: port number); and (3) From the Switch-Port set Row{M(H)}, selecting the element denoting the Switch-Port P[Sj,y] [y: port number] of the layer-2 switch Sj; and (4) Identifying the Connection-information P[Sk, x]$\leq$P [Sj, y] based on the two elements selected in the step (2) & (3); and (5) Deleting the element P[Sk, x] from the set Row{M (Sj)}; the aforesaid steps (2)~(5) are repeated, and executed till the number of elements in all the sets Row[M(Si)] is reduced to 0.

The invention described in claim 3 is the method according to claim 1 or 2, wherein the third step comprises of:

a step of identifying the Layer-2 switch which is placed in topmost-layer based on the Connection-information identified in the second step, and identifying the parent-child relationship of Layer-2 switches; and a step of generating a Layered-structure of Layer-2 switches consisting of "Connection-information of Layer-2 switches connected directly below the Layer-2 switch" and "Total number of Layer-2 switches which is placed in lowermost-layer", based on said parent-child relationship.

The invention described in claim 4 is the method according to any one of claims 1 to 3, wherein the fourth step comprises of:

a step of computing the size of a graphics object representing a Layer-2 switch to make the total width of each layer the same size, based on said Layered-structure of Layer-2 switches; and a step of drawing Layer-2 switches of each layer based on said graphics object and said size of the graphics object according to each layer, and drawing connections for Layer-2 switches using upper-lower line as a tree-type network map.

The invention described in claim 5 is the method according to any one of claims 1 to 4, wherein one or more Layer-3 switches are included in the network, comprising of:

Detecting Layer-3 switches by network monitoring manager H, which is mounted on SNMP manager, receiving SNMP management information from the Layer-3 switches which is mounted on SNMP agent, and drawing connections for Layer-2 switches by executing the aforesaid first step, second step, third step, and fourth step.

The invention described in claim 6 is a computer program embodied on a non-volatile computer readable medium of network monitoring manager H to execute processes for drawing connections for one or more Layer-2 switches as a tree-type network map, comprising of:

a first executable process for generating a MvP table consisting of a mapping table M1 and a mapping table M2 based on management information collected from the Layer-2 switches by network monitoring manager H, wherein said mapping table M1 provides a mapping between MAC address M (H) of network monitoring manager H and a Switch-Port set Row{M(H)} of ports of Layer-2 switches Sj (1≤j≤total number of Layer-2 switches) that detected said MAC address M(H), and said mapping table M2 provides a mapping between MAC address M(Sj) of Layer-2 switches Sj and Switch-Port set Row{M(Sj)} of ports of Layer-2 switches Si that detected said MAC address M(Sj);

a second executable process for normalizing the MvP table, wherein, if the same Switch-Port element is seen in both the Switch-Port set Row{M(H)} of mapping table M1 and the Switch-Port set Row{M (Sj)} of the mapping table M2, the MvP table is normalized by deleting Switch-Port elements P(Sj,n) (1≤n≤total number of ports of Layer-2 switches Sj) corresponding to the same Switch-Port from the Switch-Port set Row{M(Sj)} of mapping table M2, and Connection-information between Layer-2 switches is identified based on the normalized MvP table;

a third executable process for identifying parent-child relationship of Layer-2 switches based on said Connection-information between Layer-2 switches in the second step, and generating a Layered-structure of Layer-2 switches based on said parent-child relationship;

a fourth executable process for drawing connections for Layer-2 switches as a tree-type network map based on said Layered-structure of Layer-2 switches in the third executable process.

The invention described in claim 7 is the computer program according to claim 6, wherein the second executable process comprises of:

(1) Deleting Switch-Port elements P(Sj, n) (1≤n≤total number of ports of Layer-2 switches Sj) corresponding to the same Switch-Port from Switch-Port set Row{M(Sj)} of the mapping table M2, if the same Switch-Port is seen in both the Switch-Port set Row{M(H)} of the mapping table M1 and the Switch-Port set Row{M(Sj)} of the mapping table M2; and (2) From the Switch-Port set Row{M(Sj)} which has a singleton element, selecting the Switch-Port element P[Sk, x] (1≤k≤number of layer-2 switches, x: port number); and (3) From the Switch-Port set Row{M(H)}, selecting the element denoting the Switch-Port P[Sj,y] [y: port number] of the layer-2 switch Sj; and (4) Identifying the Connection-information P[Sk,x]≲P[Sj,y] based on the two elements selected in the step (2) & (3); and (5) Deleting the Switch-Port element P[Sk,x] from the Switch-Port set Row{M(Sj)};

the aforesaid steps (2)~(5) are repeated, and executed till the number of elements in all the Switch-Port set Rows[M(Si)] is reduced to 0.

The invention described in claim 8 is the computer program according to claim 6 or 7, wherein the third executable process comprises of:

an executable process for identifying the Layer-2 switch which is placed in topmost-layer based on the Connection-information identified in the second step, and identifying the parent-child relationship of Layer-2 switches; and an executable process for generating the Layered-structure of Layer-2 switches consisting of "Connection-information of Layer-2 switches connected directly below the Layer-2 switch" and "Total number of Layer-2 switches which is placed in lowermost-layer", based on said parent-child relationship.

The invention described in claim 9 is the computer program according to any one of claims 6 to 8, wherein the fourth executable process comprises of:

an executable process for computing the size of a graphics object representing a Layer-2 switch to make the total width of each layer the same size, based on said Layered-structure of Layer-2 switches; and an executable process for drawing Layer-2 switches of each layers based on said graphics object and said size of the graphics object according to each layer, and drawing connections for Layer-2 switches using upper-lower line as a tree-type network map.

The invention described in claim 10 is the computer program according to any one of claims 6 to 9, wherein one or more Layer-3 switches are included in the network, comprising of:

Detecting Layer-3 switches by network monitoring manager H, which is mounted on SNMP manager, receiving SNMP management information from the Layer-3 switches which is mounted on SNMP agent, and drawing connections for Layer-2 switches by executing the aforesaid first executable process, second executable process, third executable process, and fourth executable process.

Effect of the Invention

The invention described in claim 1-2 or claim 6-7 produces the effect of being able to easily derive Connection-information for one or more interconnected Layer-2 switches based on said MvP table, and being able to derive a parent-child relationship of Layer-2 switches based on said Connection-information. Further, the invention produces the effect of being able to generate a Layered-structure of Layer-2 switches based on said parent-child relationship and being able to draw connections for Layer-2 switches as a tree-type network map based on said Layered-structure. Therefore, the invention produces the effect of achieving efficient network management wherein the latest information of connections among communication apparatuses in network is available to the network administrator.

The invention described in claim 3-4 or claim 8-9 produces the effect of being able to draw connections for Layer-2 switches wherein each layer will be of the same size by computing the size of the graphics objects in each layer, and being able to draw connections for Layer-2 switches using upper-lower line as a tree-type network map. Further, the invention produces the effect of being able to show the port number of Layer-2 switches connected to other Layer-2 switches in the map. Therefore, the invention produces the effect of achieving efficient network management wherein the network administrator is able to visualize the entire network map.

The invention described in claim 5 or claim 10 produces the effect of being able to drawing connections for Layer-2 switches as a tree-type network map for a network in which there are one or more layer-3 switches. Therefore, the invention produces the effect of achieving efficient network management wherein the latest information of connections among communication apparatuses in network is available to the network administrator.

BRIEF DESCRIPTION OF DRAWINGS

FIG. 1 shows an example of network configuration for carrying out "Execution Example 1" of the present invention.

FIG. 2 shows an example of flowchart showing the network map for carrying out "Execution Example 1" of the present invention.

FIG. 3 shows an example of MvP table for carrying out "Execution Example 1" of the present invention.

FIG. 4 shows an example of "Connection-information between Layer-2 switches", "parent-child relationship of Layer-2 switches", and "Layered-structure of Layer-2 switches", for carrying out "Execution Example 1" of the present invention.

FIG. 5 shows an example of drawing connections for Layer-2 switches for carrying out "Execution Example 1" of the present invention.

FIG. 6 shows an example of network configuration for carrying out "Execution Example 2" of the present invention.

EXPLANATION OF CODES USED IN THE DIAGRAMS

H: Network monitoring manager
SX: Swich
SA, SB, SC: Layer-2 switch
SJ, SK, SL, SM: Layer-2 switch
R1, R2: Layer-3 switch
S1, S11, S12: Layer-2 switch
S2, S21: Layer-2 switch
S3, S31, S32: Layer-2 switch
S4: Layer-2 switch

BEST MODE FOR CARRYING OUT THE INVENTION

In the following, the prototype embodying best mode of the present invention is described with reference to diagrams. However, the present invention is not limited to this prototype.

1. Execution Example 1

Figure 3:
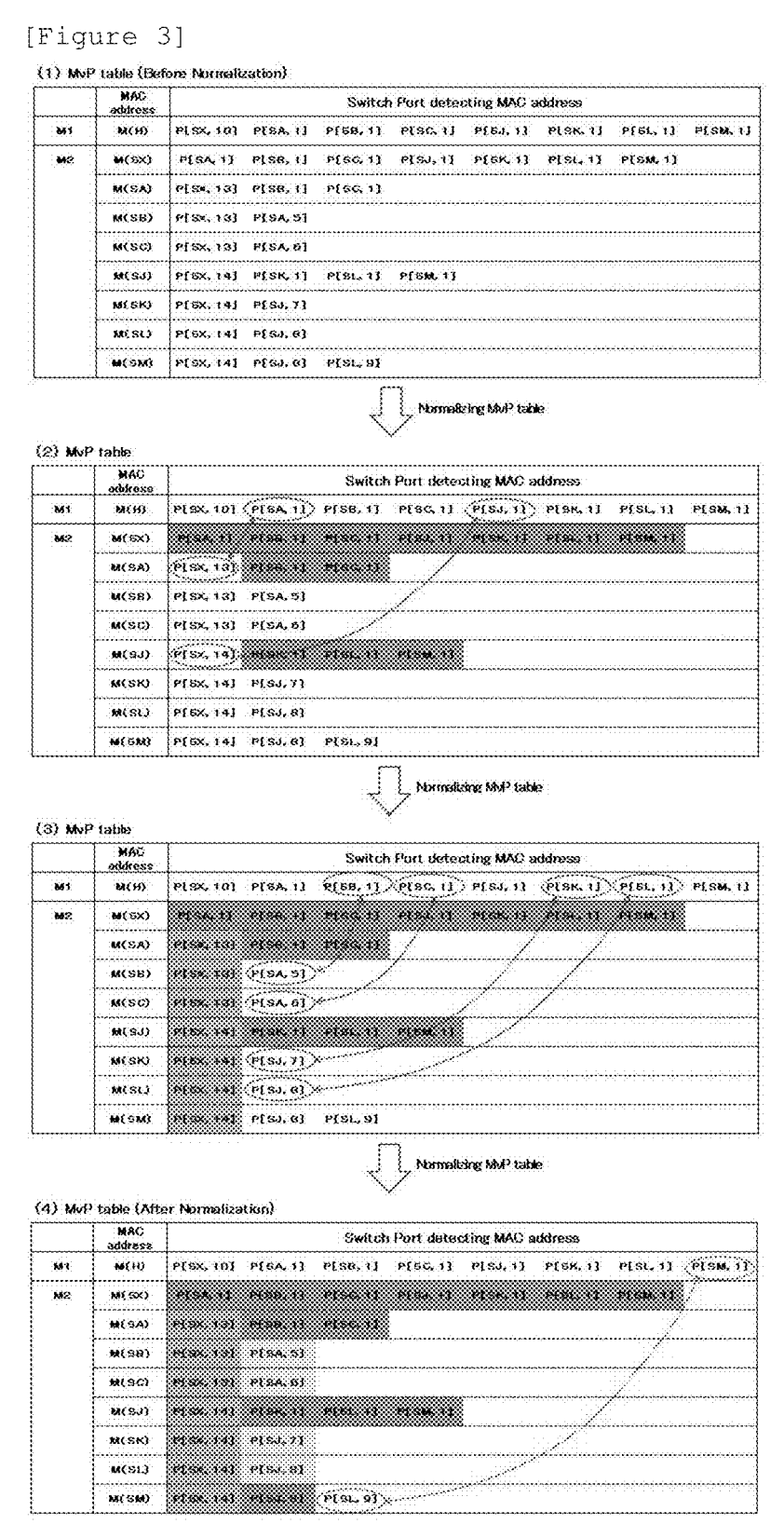

The method and the program for carrying out "Execution Example 1" of the present invention are concretely explained with reference to FIG. 1-5. FIG. 1 shows an example of the network configuration of the present invention, and shows network monitoring manager H, one or more Layer-2 switches connected in a hierarchical structure, and Layer-2 switch ports connecting other Layer-2 switches in the network. As shown in FIG. 1, the Connection-information between Layer-2 switches for each port is as follows.

(1) Layer-2 switch SX
  Port P[SX, 10]→network monitoring manager H
  Port P[SX, 13]→Layer-2 switch SA
  Port P[SX, 14]→Layer-2 switch SJ
(2) Layer-2 switch SA
  Port P[SA, 1]→Layer-2 switch SX
  Port P[SA, 5]→Layer-2 switch SB
  Port P[SA, 6]→Layer-2 switch SC
(3) Layer-2 switch SB
  Port P[SB, 1]→Layer-2 switch SA
(4) Layer-2 switch SC
  Port P[SC, 1]→Layer-2 switch SA
(5) Layer-2 switch SJ
  Port P[SJ, 1]→Layer-2 switch SX
  Port P[SJ, 7]→Layer-2 switch SK
  Port P[SJ, 8]→Layer-2 switch SL
(6) Layer-2 switch SK
  Port P[SK, 1]→Layer-2 switch SJ
(7) Layer-2 switch SL
  Port P[SL, 1]→Layer-2 switch SJ
  Port P[SL, 9]→Layer-2 switch SM
(8) Layer-2 switch SM
  Port P[SM, 1]→Layer-2 switch SL The present invention providing the method and the program for drawing connections for one or more Layer-2 switches in network as a tree-type network map is concretely explained with reference to FIG. 2.

In step S01, a MvP table consisting of a mapping table M1 and a mapping table M2 based on management information collected from the Layer-2 switches by network monitoring manager H is generated, wherein said mapping table M1 provides a mapping between MAC address M(H) of network monitoring manager H and a Switch-Port set Row{M (H)} of ports of Layer-2 switches Sj (1≤j≤total number of Layer-2 switches) that detected said MAC address M(H), said mapping table M2 provides a mapping between MAC address M(Sj) of Layer-2 switches Sj and Switch-Port set Row{M (Sj)} of ports of Layer-2 switches Sj that detected said MAC address M(Sj).

Where for example, network monitoring manager H, in which SNMP (Simple Network Management Protocol) manager is implemented, can receive management information from Layer-2 switches Sj, in which SNMP agent is implemented, via SNMP communication.

In the example of network configuration shown in FIG. 1, when step 01 is executed, the MvP table (Before Normalization) shown in FIG. 3(1) is created.

Next in step S02, if the same Switch-Port element is seen in both the Switch-Port set Row{M(H)} of the mapping table M1 and the Switch-Port set Row{M(Sj)} of the mapping table M2, the MvP table is normalized by deleting Switch-Port elements P (Sj, n) (1≤n≤total number of ports of Layer-2 switches Sj) corresponding to the same Switch-Port from the Switch-Port set Row{M(Sj)} of the mapping table M2, and Connection-information between Layer-2 switches is identified based on normalized MvP table.

The specific procedure of step S02 is as follows.

(1) Deleting Switch-Port elements P (Sj, n) (1≤n≤total number of ports of Layer-2 switches Sj) corresponding to the same Switch-Port from Switch-Port set Row{M(Sj)} of the mapping table M2, if the same Switch-Port is seen in both the Switch-Port set Row{M(H)} of the mapping table M1 and the Switch-Port set Row{M(Sj)} of the mapping table M2; and (2) From the Switch-Port set Row{M(Sj)} which has a singleton element, selecting the Switch-Port element P[Sk, x] (1≤k≤number of layer-2 switches, x: port number); and (3) From the Switch-Port set Row{M(H)}, selecting the element denoting the Switch-Port P[Sj,y] [y: port number] of the layer-2 switch Sj; and (4) Identifying the Connection-information P[Sk,x]⇔P[Sj,y] based on the two elements selected in the step (2) & (3); and (5) Deleting the element P[Sk,x] from the set Row{M(Sj)}; the aforesaid steps (2)~(5) are repeated, and executed till the number of elements in all the sets Row[M(Si)] is reduced to 0.

In the example of network configuration shown in FIG. 1, when step S02 (1) is executed, the MvP table shown in FIG. 3(2) is created. Here, the shaded portions in FIG. 3(2) indicate deleted elements (port information).

Next, in the example of network configuration shown in FIG. 1, when step S02 (2)-(4) are executed, the following two pieces of Connection-information are identified from the MvP table shown in FIG. 3(2).

① P[SX,13]⇔P[SA,1]
② P[SX,14]⇔P[SJ,1]

Next, in the example of network configuration shown in FIG. 1, when step S02 (5) is executed, the MvP table shown in FIG. 3(3) is created. Here, the shaded portions in FIG. 3(3) indicate deleted elements (port information).

Next, in the example of network configuration shown in FIG. 1, when step S02 (2)-(4) are executed, the following four pieces of Connection-information are identified from the MvP table shown in FIG. 3(3).

③ [SA, 5]⇔P[SB, 1]
④ [SA, 6]⇔P[SC, 1]
⑤ [SA, 7]⇔P[SK, 1]
⑥ [SA, 8]⇔P[SL, 1]

Next, in the example of network configuration shown in FIG. 1, when step S02 (5) is executed, the MvP table (After Normalization) shown in FIG. 3(4) is created. Here, the shaded portions in FIG. 3(3) indicate deleted elements (port information).

Next, in the example of network configuration shown in FIG. 1, when step S02 (2)-(4) are executed, the following one piece of Connection-information are identified from the MvP table shown in FIG. 3(4).

⑦ P[SL, 9]⇔P[SM, 1]

Next, in the example of network configuration shown in FIG. 1, when step S02 (5) is executed, the number of elements in all the sets Row[M(Si)] is reduced to 0, and step S02 ends. The Connection-information identified in step S02 is as shown in FIG. 4.

Next in step S03, the Layer-2 switch which is placed in topmost-layer is identified based the Connection-information ①-⑦ identified in step S02, and the parent-child relationship of Layer-2 switches connected directly below the Layer-2 switch is identified. The specific procedure of identifying the parent-child relationship is as follows.

(a) Layer-2 switches which are placed in lowermost-layer are identified. In particular, the Layer-2 switch which is connected to only one Layer-2 switch is identified as placed in lowermost-layer based the Connection-information identified in step S02. In FIG. 4, Layer-2 switch SB, SC, SK, and SM are identified as placed in lowermost-layer.

(b) Next, parent Layer-2 switches connected to the upper level of switch SB, SC, SK, and SM are identified based the Connection-information. In FIG. 4, parent Layer-2 switch SA of Layer-2 switch SB and SC is identified, parent Layer-2 switch SJ of Layer-2 switch SK is identified, and parent Layer-2 switch SL of Layer-2 switch SM is identified.

(c) Next, parent Layer-2 switches connected to the upper level of switch SA, SJ, and SL are identified based the Connection-information. In FIG. 4, parent Layer-2 switch SX of Layer-2 switch SA is identified, parent Layer-2 switch SX of Layer-2 switch SJ is identified, and parent Layer-2 switch SJ of Layer-2 switch SL is identified.

(d) Next, parent Layer-2 switches connected to the upper level of switch SX cannot been identified. Therefore, the Layer-2 switch SX which is placed in topmost-layer is identified.

The parent-child relationship identified by the above procedure (a)-(d) are shown in FIG. 4.

Next, the Layered-structure of Layer-2 switches consisting of "Connection-information of Layer-2 switches connected directly below the Layer-2 switch" and "Total number of Layer-2 switches which is placed in lowermost-layer" is generated based on said parent-child relationship. The Layered-structure of Layer-2 switches is as shown in FIG. 4.

(1) Layer-2 switch SX
Layer-2 switches connected directly below SX→SA, SJ
Total number of Layer-2 switches as placed in lowermost-layer→4 pieces (SB, SC, SK, SM)

(2) Layer-2 switch SA
Layer-2 switches connected directly below SA→SB, SC
Total number of Layer-2 switches as placed in lowermost-layer→2 pieces (SB, SC)

(3) Layer-2 switch SB
Layer-2 switches connected directly below SB→none
Total number of Layer-2 switches as placed in lowermost-layer→0 pieces (4) Layer-2 switch SC
Layer-2 switches connected directly below SC→none
Total number of Layer-2 switches as placed in lowermost-layer→0 pieces (5) Layer-2 switch SJ
Layer-2 switches connected directly below SJ→SK, SL
Total number of Layer-2 switches as placed in lowermost-layer→2 pieces (SK, SM)

(6) Layer-2 switch SK
Layer-2 switches connected directly below SK→none
Total number of Layer-2 switches as placed in lowermost-layer→0 pieces (7) Layer-2 switch SL
Layer-2 switches connected directly below SL→SM
Total number of Layer-2 switches as placed in lowermost-layer→1 pieces (SM)

(8) Layer-2 switch SM
Layer-2 switches connected directly below SM→none
Total number of Layer-2 switches as placed in lowermost-layer→0 pieces Next in step S04, connections for Layer-2 switches are drawn as a tree-type network map based on said Layered-structure of Layer-2 switches created in step S03. An example of the specific procedure of drawing connections for Layer-2 switches is as follows.

This procedure indicates to decide a graphics object of the Layer-2 switch and computing the size of a graphics object representing a Layer-2 switch to make the total width of each layer the same size, based on the Layered-structure of Layer-2 switches shown in FIG. 4. This procedure is shown specifically as follows.

At first step, the size [W: Width, H: Height] of the graphics object of Layer-2 switches as placed in lowermost-layer is decided. Furthermore, the drawing size [DW=W+IW, DH=H+IH] (IW; Horizontal gap between switches, IH: Vertical gap between switches) of the Layer-2 switches is decided. As shown in FIG. 4, the overall width {4W+3IW} of 4 pieces of the graphics object of Layer-2 switches as placed in lowermost-layer is decided. Therefore, the overall width {4W+3IW} of the network map is decided.

At next step, the size of the graphics object for each layer is decided. The Layer-2 switch SX which is placed in topmost-layer is a singleton, then the Width size (drawing size) of SX is assigned the same value as the overall width {4W+3IW} of the network map.

At next step, the object size of the Layer-2 switches SA and SB, which are connected directly below SX, is computed. There are 2 Layer-2 switches in this layer, so the Width size (drawing size) {2W+IW} of SA and SB is assigned.

As described above, the Width size of the graphics object of the Layer-2 switch for each layer is computed. Further, the Height size of the Layer-2 switch is determined in consideration of the balance of the entire map.

At next step, based on the graphics object of the Layer-2 switch and the size of the graphics object which are computed above, the graphics objects of the Layer-2 switch for each layer are connected using upper-lower line as in a tree-type network map.

Furthermore, the port number at which a Layer-2 switch is connected to another communication apparatus is shown in the map. Thereby, monitoring of detailed information of Layer-2 switches is achieved.

The example of tree-type network map, as which connections for Layer-2 switches is drawn by above step S01-S04, is shown as FIG. 5. Therefore, the invention produces the effect of achieving efficient network management with showing the latest information of the configuration and monitoring easily the entire network map visually by network administrator.

2. Execution Example 2

The method and the program for carrying out "Execution Example 2" of the present invention are concretely explained with reference to the network configuration shown in FIG. 6. FIG. 6 shows an example of the network configuration of the present invention, wherein Layer-3 switches R1 and R2 are included in the network consisting of four segments.

In FIG. 6, the network monitoring manager H, on which SNMP manager is mounted, detects that the network includes Layer-3 switches R1 and R2 and the network is composed of four segments, by receiving SNMP management information from the Layer-3 switches.

Therefore, connections for Layer-2 switches are drawn as a tree-type network map in each segment by executing step S01-S04 described above according to each segment. Therefore, the invention produces the effect of achieving efficient network management with monitoring easily the entire network map visually in the network including one or more Layer-3 switches by network administrator.

3. Execution Example 3

The computer program for carrying out "Execution Example 3" of the present invention are concretely explained. The method described in "Execution Example 1" and "Execution Example 2" can be implemented by a computer program embodied on a non-volatile computer readable medium of network monitoring manager H. For example, the procedure of the present invention can be executed by the computer program embodied on network monitoring manager H which is mounted on SNMP manager.

For example, the computer program which implements the step S01-S04 described in "Execution Example 1" can be configured to be executed according to an instruction from network administrator. Furthermore, the computer program which implements the procedure described in "Execution Example 2" can be configured to be executed according to an instruction from network administrator.

Then for example, the computer program can be configured to be executed after a predetermined time progress or at predetermined time. Therefore, the invention produces the effect of achieving efficient network management with monitoring the latest information easily and monitoring the entire network map visually by network administrator.

What is claimed is:

1. A method for drawing connections for one or more Layer-2 switches as in a tree-type network map, comprising of:

a first step of generating a MvP table consisting of a mapping table M1 and a mapping table M2 based on management information collected from the Layer-2 switches by network monitoring manager H, wherein said mapping table M1 provides a mapping between MAC address M(H) of network monitoring manager H and a Switch-Port set Row{M(H)} of ports of Layer-2 switches Sj, wherein 1≤j≤total number of Layer-2 switches, where j is an integer number, that detected said MAC address M(H), and said mapping table M2 provides a mapping between MAC address M(Sj) of Layer-2 switches Sj and Switch-Port set Row{M(Sj)} of ports of Layer-2 switches Sj that detected said MAC address M(Sj);

a second step of normalizing the MvP table, wherein, if a same Switch-Port element is seen in both the Switch-Port set Row{M(H)} of the mapping table M1 and the Switch-Port set Row{M(Sj)} of the mapping table M2, the MvP table is normalized by deleting Switch-Port elements P(Sj,n) wherein 1≤n≤total number of ports of Layer-2 switches Sj, corresponding to the same Switch-Port element from the Switch-Port set Row{M(Sj)} of the mapping table M2, and Connection-information between Layer-2 switches is identified based on normalized MvP table;

a third step of identifying parent-child relationship of Layer-2 switches based on said Connection-information between Layer-2 switches in the second step, and generating a Layered-structure of Layer-2 switches based on said parent-child relationship;

a fourth step of drawing connections for Layer-2 switches as a tree-type network map based on said Layered-structure of Layer-2 switches in the third step.

2. The method according to claim 1, wherein the second step comprises of:

(1) Deleting Switch-Port elements P(Sj,n), wherein 1≤n≤total number of ports of Layer-2 switches Sj, corresponding to the same Switch-Port element from Switch-Port set Row{M(Sj)} of the mapping table M2, if the same Switch-Port is seen in both the Switch-Port set Row {M(H)} of the mapping table M1 and the Switch-Port set Row {M(Sj)} of the mapping table M2; and (2) From the Switch-Port set Row{M(Sj)} which has a singleton element, selecting the Switch-Port element P[Sk,x] wherein 1≤k≤number of layer-2 switches, x: port number; wherein k and x are integers; and (3) From the Switch-Port set Row{M(H)}, selecting the element denoting the Switch-Port P[Sj,y] y: port number of the layer-2 switches Sj; and (4) Identifying the Connection-information P[Sk,x]⇔P[Sj,y] based on the two elements selected in the step (2) & (3); and (5) Deleting the element P[Sk,x] from the set Row {M(Sj)}; the aforesaid steps (2)~(5) are repeated, and executed till the number of elements in all the sets Row[M(Si)] is reduced to 0.

3. The method according to claim 1 wherein the third step comprises of:

a step of identifying a Layer-2 switch which is placed in topmost-layer based on the Connection-information identified in the second step, and identifying the parent-child relationship of Layer-2 switches; and a step of generating a Layered-structure of Layer-2 switches consisting of Connection-information of Layer-2 switches connected directly below a Layer-2 switch and Total number of Layer-2 switches which is placed in lowermost-layer, based on said parent-child relationship.

4. The method according to claim 1, wherein the fourth step comprises of:

a step of computing the size of a graphics object representing a Layer-2 switch to make the total width of each layer the same size, based on said Layered-structure of Layer-2 switches; and a step of drawing Layer-2 switches of each layers based on said graphics object and said size of the graphics object, and drawing connections for Layer-2 switches using upper-lower line as in a tree-type network map.

5. The method according to claim 1, wherein one or more Layer-3 switches are included in the tree-type network map, comprising of:

Detecting Layer-3 switches by network monitoring manager H, which is mounted on SNMP manager, receiving SNMP management information from the Layer-3 switches which is mounted on SNMP agent, and drawing connections for Layer-2 switches by executing the aforesaid first step, second step, third step, and fourth step.

6. A non-transitory computer readable medium embodied with a computer program to be executed by network monitoring manager H to perform processes for drawing connections for one or more Layer-2 switches as a tree-type network map, comprising of:

a first executable process for generating a MvP table consisting of a mapping table M1 and a mapping table M2 based on management information collected from the Layer-2 switches by network monitoring manager H, wherein said mapping table M1 provides a mapping between MAC address M(H) of network monitoring manager H and a Switch-Port set Row {M(H)} of ports of Layer-2 switches Sj wherein 1≤j≤total number of Layer-2 switches, j is an integer number that detected said MAC address M(H), and said mapping table M2 provides a mapping between MAC address M(Sj) of Layer-2 switches Sj and Switch-Port set Row{M(Sj)} of ports of Layer-2 switches Si that detected said MAC address M(Sj);

a second executable process for normalizing the MvP table, wherein, if a same Switch-Port element is seen in both the Switch-Port set Row{M(H)} of mapping table M1 and the Switch-Port set Row{M(Sj)} of the mapping table M2, the MvP table is normalized by deleting Switch-Port elements P(Sj,n) wherein 1≤n≤total number of ports of Layer-2 switches Sj corresponding to the same Switch-Port element from the Switch-Port set Row{M(Sj)} of mapping table M2, and Connection-information between Layer-2 switches is identified based on the normalized MvP table;

a third executable process for identifying parent-child relationship of Layer-2 switches based on said Connection-information between Layer-2 switches in the second step, and generating a Layered-structure of Layer-2 switches based on said parent-child relationship;

a fourth executable process for drawing connections for Layer-2 switches as a tree-type network map based on said Layered-structure of Layer-2 switches in the third executable process.

7. The non-transitory computer readable medium according to claim 6, wherein the second executable process comprises of:

(1) Deleting Switch-Port elements P(Sj,n) wherein 1≤n≤total number of ports of Layer-2 switches Sj corresponding to the same Switch-Port element from Switch-Port set Row{M(Sj)} of the mapping table M2, if the same Switch-Port is seen in both the Switch-Port set Row {M(H)} of the mapping table M1 and the Switch-Port set Row {M(Sj)} of the mapping table M2; and (2) From the Switch-Port set Row{M(Sj)} which has a singleton element, selecting the Switch-Port element P[Sk,x] wherein 1≤k≤number of layer-2 switches, x: port number; wherein k and x are integers; and (3) From the Switch-Port set Row{M(H)}, selecting the element denoting the Switch-Port P[Sj,y] y: port number of the layer-2 switches Sj; and (4) Identifying the Connection-information P[Sk,x]⇔P[Sj,y] based on the two elements selected in the step (2) & (3); and (5) Deleting the Switch-Port element P[Sk,x] from the Switch-Port set Row{M(Sj)};

the aforesaid steps (2)~(5) are repeated, and executed till the number of elements in all the Switch-Port set Rows[M(Si)] is reduced to 0.

8. The non-transitory computer readable medium according to claim 6, wherein the third executable process comprises of:

an executable process for identifying the Layer-2 switch which is placed in topmost-layer based on the Connection-information identified in the second step, and identifying the parent-child relationship of Layer-2 switches; and an executable process for generating the Layered-structure of Layer-2 switches consisting of Connection-information of Layer-2 switches connected directly below the Layer-2 switch and Total number of Layer-2 switches which is placed in lowermost-layer, based on said parent-child relationship.

9. The non-transitory computer readable medium according to claim 6, wherein the fourth executable process comprises of:

an executable process for computing the size of a graphics object representing a Layer-2 switch to make the total width of each layer the same size, based on said Layered-structure of Layer-2 switches; and an executable process for drawing Layer-2 switches of each layer based on said graphics object and said size of the graphics object according to each layer, and drawing connections for Layer-2 switches using upper-lower line as a tree-type network map.

10. The non-transitory computer readable medium according to claim 6, wherein one or more Layer-3 switches are included in the tree-type network map, comprising of:

Detecting Layer-3 switches by network monitoring manager H, which is mounted on SNMP manager, receiving SNMP management information from the Layer-3 switches which is mounted on SNMP agent, and drawing connections for Layer-2 switches by executing the aforesaid first executable process, second executable process, third executable process, and fourth executable process.

* * * * *